D. L. WILLIAMS.
HORSE COLLAR PAD.
APPLICATION FILED AUG. 5, 1913.
1,108,049.
Patented Aug. 18, 1914.
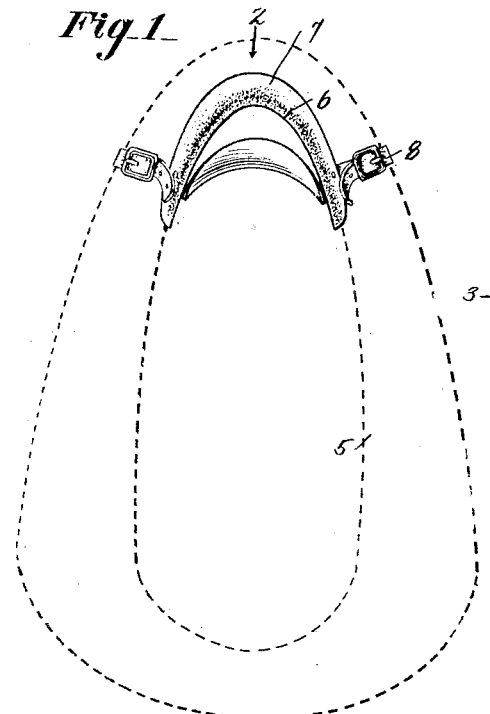
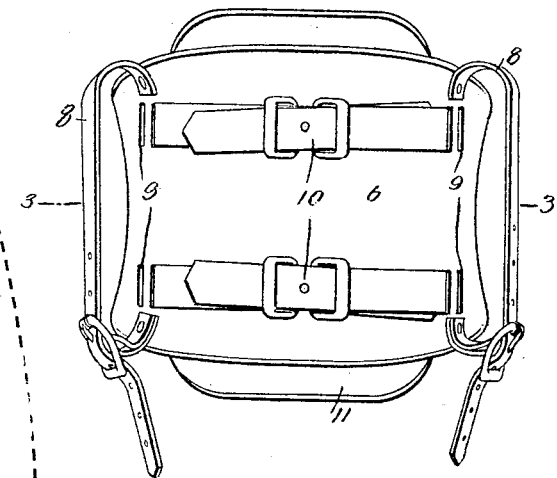
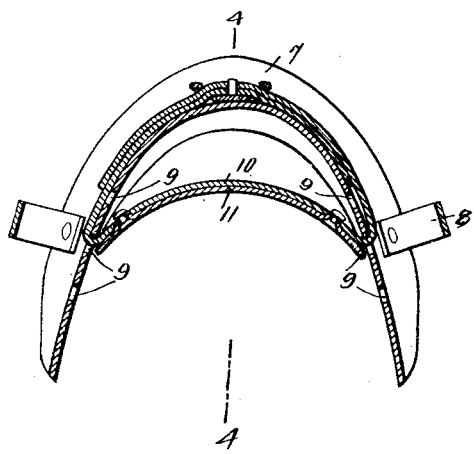
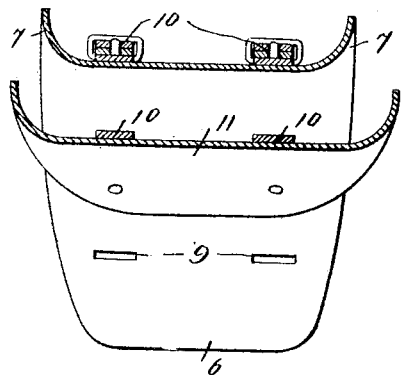
WITNESSES
Frank C. Palmer
B. Joff
INVENTOR
David L. Williams
BY
ATTORNEYS

UNITED STATES PATENT OFFICE.

DAVID L. WILLIAMS, OF ORD, NEBRASKA, ASSIGNOR TO WILLIAMS-GREGG MANUFACTURING COMPANY, OF ORD, NEBRASKA.

HORSE-COLLAR PAD.

1,108,049.  Specification of Letters Patent.  Patented Aug. 18, 1914.

Application filed August 5, 1913. Serial No. 783,034.

*To all whom it may concern:*

Be it known that I, DAVID L. WILLIAMS, a citizen of the United States, and a resident of Ord, in the county of Valley and State of Nebraska, have invented a new and Improved Horse-Collar Pad, of which the following is a full, clear, and exact description.

My invention relates to improvements in horse collars, and has reference more particularly to pads for the same by means of which the collar opening may be varied in size to fit the necks of different horses.

The object of the invention is to provide an inexpensive, simple and efficient pad for a closed horse collar whereby the same can be adjusted to fit the necks of different horses.

The invention consists of the construction and combination of parts to be more fully described hereinafter and fully set forth in the claim.

Reference is to be had to the accompanying drawings forming a part of this specification, in which like characters indicate corresponding parts in all the views and in which:

Figure 1 is a front elevation of a horse collar, shown in dotted line, embodying my invention, which is shown in full line; Fig. 2 is a plan view in the direction shown by the arrow in Fig. 1; Fig. 3 is a section on line 3—3, Fig. 2; and Fig. 4 is a section on line 4—4, Fig. 3.

Referring to the drawings, 5 represents a horse collar the opening of which receives a member 6 at the top thereof which fits snugly into this top portion of the opening of the collar. The side edges 7 of the member are raised so as to fit snugly against the sides of the collar, and adjacent the ends of the member 6 these edges are provided with straps 8 by means of which the member 6 is secured to the collar. The tendency of these straps when secured to the collar is to force the member 6 against the top of opening in the collar, due to the convergence of the sides at this end of the collar.

The member 6 adjacent each corner is provided with openings 9. The openings 9 disposed in the corners adjacent the same raised side 7 are paired with respect to the central portion of the member. Engaging these paired openings 9 are straps 10, which are secured to a pad 11. Pad 11 is shaped to a form similar to the upper portion of the opening of a horse collar. As shown in Fig. 3, the pad 11 engages the paired middle openings 9. By removing the straps to the lower or upper openings 9, the size of the collar opening will be reduced or increased respectively, so that by providing a sufficient number of openings 9 a large variation of sizes can be obtained with a single closed collar provided with my invention, which will permit the use of a single collar for horses having different sizes of necks. The connection of the pad 11 to the member 6 by straps 10 makes the suspension of the pad flexible in the opening of the closed horse collar.

Having thus described my invention, what I claim as new and desire to secure by Letters Patent is:

In combination with a closed horse collar, a pad comprising a member fitting into the top of the collar, straps secured to said member adjacent the ends thereof for removably securing the said member to the collar, said member having rounded sides arranged to engage the collar whereby the said member is prevented from lateral displacement, an adjustable pad member, straps carried by said adjustable pad member, said first mentioned member having a series of openings adjacent each end and adapted to be removably engaged by said straps carried by said adjustable pad member, whereby the adjustable pad member is supported by said first mentioned member and can be adjusted by said last mentioned straps relatively to said member, substantially as and for the purpose set forth.

In testimony whereof I have signed my name to this specification in the presence of two subscribing witnesses.

DAVID L. WILLIAMS.

Witnesses:
CHES CHINN,
W. B. GREGG.

Copies of this patent may be obtained for five cents each, by addressing the "Commissioner of Patents, Washington, D. C."